United States Patent
Zollinger et al.

(10) Patent No.: US 10,007,821 B2
(45) Date of Patent: Jun. 26, 2018

(54) INTERROGATOR SYSTEM, APPARATUS AND METHOD

(71) Applicant: SATO VICINITY PTY LTD, Clayton (AU)

(72) Inventors: Heinz Zollinger, Wahroonga (AU); Graham Alexander Munro Murdoch, Wollstonecraft (AU)

(73) Assignee: SATO HOLDINGS CORPORATION, Tokyo (JP)

( * ) Notice: Subject to any disclaimer, the term of this patent is extended or adjusted under 35 U.S.C. 154(b) by 0 days. days.

(21) Appl. No.: 14/784,622

(22) PCT Filed: Apr. 15, 2014

(86) PCT No.: PCT/AU2014/000442
§ 371 (c)(1),
(2) Date: Oct. 15, 2015

(87) PCT Pub. No.: WO2014/169340
PCT Pub. Date: Oct. 23, 2014

(65) Prior Publication Data
US 2016/0078263 A1 Mar. 17, 2016

(30) Foreign Application Priority Data

Apr. 15, 2013 (AU) .................. 2013901307

(51) Int. Cl.
*G06F 19/00* (2018.01)
*H01Q 21/00* (2006.01)
(Continued)

(52) U.S. Cl.
CPC ..... *G06K 7/10425* (2013.01); *G06K 7/10257* (2013.01); *G06K 7/10316* (2013.01);
(Continued)

(58) Field of Classification Search
CPC .......... G06K 17/00; G06K 2017/0051; G06K 7/10316; G06K 7/10336; G06K 7/10425;
(Continued)

(56) References Cited

U.S. PATENT DOCUMENTS

2006/0028392 A1* 2/2006 Coveley ............ G06K 7/10178
343/893
2006/0163350 A1 7/2006 Melton et al.
(Continued)

FOREIGN PATENT DOCUMENTS

| JP | 2002-522849 A | 7/2002 |
| JP | 2009-123090 A | 6/2009 |
| WO | 00/10122 A2 | 2/2000 |

OTHER PUBLICATIONS

International Search Report for PCT/AU2014/000442 dated Jul. 11, 2014 [PCT/ISA/210].
(Continued)

*Primary Examiner* — Dionne H Pendleton
(74) *Attorney, Agent, or Firm* — Sughrue Mion, PLLC

(57) ABSTRACT

The present invention relates to the identification of RFID devices that are arranged closely together and placed on shelving for logistical and storage purposes. Furthermore, the aspects of the present invention relate to an arrangement and/or layout of antenna coils for example in an interrogator. There is disclosed a RFID interrogator and/or method of interrogating comprising, in one form, an RFID docking station consisting of a stationary RFID interrogator with RFID shelving antennas and mobile cabinets with shelves where the docking station antennas and the cabinet shelves interpenetrate when the mobile cabinet is offered up to the docking station such that the antennas are able to identify tagged items on the cabinet shelves.

In another form, an RFID docking station consisting of a mobile RFID interrogator with RFID shelving antennas and (Continued)

stationary cabinets with shelves where the docking station antennas and the cabinet shelves interpenetrate when the docking station is offered up to the shelving such that the antennas are able to identify tagged items on the cabinet shelves.

16 Claims, 11 Drawing Sheets

(51) Int. Cl.
| | |
|---|---|
| *G06K 7/10* | (2006.01) |
| *H01Q 1/36* | (2006.01) |
| *G06Q 10/08* | (2012.01) |
| *H01Q 1/22* | (2006.01) |
| *H01Q 7/00* | (2006.01) |
| *H04B 5/00* | (2006.01) |
| *G06K 17/00* | (2006.01) |

(52) U.S. Cl.
CPC ..... *G06K 7/10326* (2013.01); *G06K 7/10336* (2013.01); *G06Q 10/087* (2013.01); *H01Q 1/2216* (2013.01); *H01Q 1/36* (2013.01); *H01Q 7/00* (2013.01); *H01Q 21/00* (2013.01); *H04B 5/0031* (2013.01); *H04B 5/0062* (2013.01); *H04B 5/0081* (2013.01); *F25D 2700/08* (2013.01); *G06K 17/00* (2013.01); *G06K 2017/0051* (2013.01)

(58) Field of Classification Search
CPC ......... G06K 7/10366; G06K 19/0723; G06K 19/07749; G06K 7/10009; G06K 7/10108; G06K 7/10178; G06K 7/10356; G06K 7/10376; G06K 7/10386; G06K 7/10475; G06K 7/10415; G06Q 10/087; G06Q 10/0875; G06Q 50/22; G06Q 50/24; H01Q 1/2216; H01Q 21/00; H01Q 7/00; H01Q 1/22; H01Q 1/2225; H04B 5/0062; H04B 5/0031; H04B 5/0081; G06F 19/30; G06F 19/322; G06F 19/326; G06F 19/3462

See application file for complete search history.

(56) References Cited

U.S. PATENT DOCUMENTS

| | | | |
|---|---|---|---|
| 2006/0255949 A1* | 11/2006 | Roeder | B62B 3/06 340/572.7 |
| 2007/0034692 A1 | 2/2007 | Johnson | |
| 2007/0251521 A1* | 11/2007 | Schackmuth | G06Q 50/12 126/369 |
| 2012/0060383 A1* | 3/2012 | Goddard | B66F 9/0755 33/228 |
| 2013/0194077 A1* | 8/2013 | Vargas | G06K 7/10386 340/10.6 |
| 2014/0015648 A1* | 1/2014 | Murdoch | G06K 19/0723 340/10.3 |
| 2014/0197926 A1* | 7/2014 | Nikitin | G06K 7/10009 340/10.1 |
| 2014/0197954 A1* | 7/2014 | Caputo | G06K 7/10366 340/572.1 |
| 2014/0263634 A1* | 9/2014 | Iqbal | G06Q 10/087 235/385 |
| 2014/0291397 A1* | 10/2014 | Caputo | G06Q 10/087 235/385 |
| 2016/0113721 A1* | 4/2016 | Seremjian | G07F 17/0092 340/12.51 |
| 2017/0128326 A1* | 5/2017 | Lehmann | A61J 7/0436 |

OTHER PUBLICATIONS

Written Opinion for PCT/AU2014/000442 dated Jul. 11, 2014 [PCT/ISA/237].

Communication dated Jan. 9, 2018 from the Japanese Patent Office in counterpart application No. 2016-506736.

* cited by examiner

INTERROGATOR SYSTEM, APPARATUS AND METHOD

CROSS REFERENCE TO RELATED APPLICATIONS

This application is a National Stage of International Application No. PCT/AU2014/000442, filed on Apr. 15, 2014, which claims priority from Australian Patent Application No. 2013901307, filed on Apr. 15, 2013, the contents of all of which are incorporated herein by reference in their entirety.

FIELD OF INVENTION

The present invention relates to the field of radio frequency identification (RFID).

In one form, the invention relates to systems, devices, and/or methods used in association with the field of identification, such as RFID. The invention has application in interrogating multiple active and/or passive transponders which are associated with objects to be identified and which will be described hereinafter with reference to that application. A specific, non-limiting, application is the identification of RFID transponders or other RFID devices, such as those attached to items or embedded in plastic tokens or cards that are stacked on each other and placed on shelving for logistical and storage purposes.

It will be convenient to hereinafter describe the invention in relation to identification of RFID transponders placed on shelves; however it should be appreciated that the present invention is not limited to that use only.

BACKGROUND ART

The discussion throughout this specification comes about due to the realisation of the inventors and/or the identification of certain prior art problems by the inventors.

The applicants are aware of a number of transponder systems that provide two dimensional, limited three dimensional or full three dimensional interrogator capabilities. These systems utilise a multiplicity of interrogator coils operating in different coordinate axis, to achieve the resultant two or three dimensional operation.

One example of an interrogator which produces a relatively uniform field in three dimensions is disclosed in U.S. Pat. No. 5,258,766 and international application PCT/AU95/00436. This form of interrogator is known as a Tunnel Reader Programmer (TRP). While a TRP has three dimensional interrogation properties, the inventors have realised that this technology is suitable for applications where the RFID transponders are moved in and out of the TRP, usually on a conveyor or similar. There is still a need to provide an interrogator which is adapted to operate on a relatively flat surface such as a shelf, storage system, table or wall. For these applications relatively flat planar antenna coils may be used.

The inventors have also realised that relatively flat planar antenna coils produce fields in only one direction at any point relative to the coil and do not have a three dimensional interrogation capability.

The inventors have further realised that when items are stored, for example, on shelving, storage systems, draws or other means of storage, the orientation of the item, and consequently, the orientation of the tag associated with the item cannot be guaranteed to be in alignment with the direction required for interrogation, especially by a flat planar antenna coil. Thus, if RFID and remote powering is used in applications where orientation of items to be identified cannot be guaranteed, such as shelving and storage systems, medical device tracking, document tracking, luggage identification, gaming tokens, by way of example only, the above identified problem can lead to items being missed, that is, not correctly identified.

WO2007/030861 discloses an antenna design and method of operation which enables a 3 dimensional interrogation field to be created from a flat planar antenna. In essence, the disclosure of WO2007030861 provides for a series of parallel spaced conductors through which currents are sequentially switched in order to produce both tangential and normal magnetic field components. The spatial relationship of the sequentially switched currents is chosen to ensure that at different times a tangential and a normal magnetic field components are produced at the same location. The conductors are preferably arranged in a planar fashion and the tangential and normal magnetic fields are produced above (or below) the planar surface. A single layer of parallel spaced conductors provides for two dimensional operations. Adding a second parallel layer of orthogonally oriented parallel spaced conductors provides three dimensional operations where currents are sequentially switched in both layers.

FIG. 1 illustrates, in schematic form, a conventional single coil of rectangular form through which a current flows. The resulting magnetic field directions are shown and related to the X, Y and Z coordinate directions. At different regions above (or below) the coil, the magnetic field has a unique direction which is variously in the X, the Y or the Z directions, or some combination of these directions in transition regions. FIG. 2 illustrates these regions.

FIG. 3 shows an array of coils and illustrates how, when appropriately switched, a field in the X, Y and Z directions is produced as described in WO2007/030861. In this regard, by suitably overlapping generally rectangular coils and then sequentially switching each coil so that only one coil is active at any time, at any point above (or below) the overlapped coils, a field in the X direction, the Y direction and the Z direction may be produced at some time. In order to suitably switch the coils as shown in FIG. 3, the signal from an RFID reader must be controlled by a MUX circuit which directs the RFID reader signal to each coil in the array in a sequentially manner. In addition to the MUX, special circuits in each coil are required to tune the coils and ameliorate the effects of coupling (both capacitive and inductive) between coils which can lead to the generation of parasitic currents in the inactive coils. These parasitic currents may cause, amongst other things, distortion of the active coil's magnetic field, changes in the active coil's tuning, increase of the active coil's losses and a reduction of the RFID current in the active coil. These parasitic currents are considered undesirable.

The inventors are aware that the circuits described in application WO2009/149506 that control the switching of the coils in the antenna array and ameliorate the effect of stray coupling, also may add to the complexity and cost of the antenna array. Where a relatively large array area is required, it is considered that both the cost and complexity of the array may become very high. A relatively high cost of a relatively large area antenna array is considered an impediment which may prevent the implementation of RFID in various applications.

Australian Patent Application 2013201425 describes how an antenna is shifted (displaced or moved) in at least one, or in any combination of the x, y and/or z directions in order to create the effect of interrogation by a relatively large antenna array in 1, 2 and/or 3 dimensions. The invention provides for a method of creating an arbitrarily large array that can read in 1, 2 or 3 dimensions by shifting an antenna or small antenna array in one or more plane(s) to create a large "virtual" array. The process of sequentially switching coils (as shown in the prior art) is replaced with at least a single coil, or smaller coil array, which is shifted to a series of positions within an interrogation area, where at each position, interrogation is undertaken or activated in order to mimic the process of sequentially switching an (otherwise) larger coil array. The invention shown in Australian Patent Application 2013201425 is advantageously suited to relatively large fixed shelving and storage installations such as are shown in FIG. 7 and FIG. 8 of Australian Patent Application 2013201425 where there is a need to create an antenna array that can read in 1, 2 or 3 dimensions over a relatively large area at a reduced cost. Such an antenna would be considered highly advantageous and allow the wide scale adoption of RFID in applications where the high implementation cost has previously prevented the adoption of RFID.

There are however shelving applications where an RFID enabled cabinet such as shown in FIG. 34 of WO2007030861 may be advantageous to use rather than a relatively large fixed RFID shelving installations. The RFID shelving cabinet as shown in FIG. 34 of WO2007/030861 incorporates the planar antenna array described in WO2007/030861 into some or all of its shelves. Such an RFID shelving cabinet may be advantageous, for example, because cabinets can be easily made portable by being mounted on wheels. This feature can be advantageous for example in a hospital where a cabinet with all the supplies for an operation can be wheeled into an operating theatre and the supplies used during the operation can be automatically recorded for stocktake, billing and ordering purposes. Another advantage of an RFID shelving cabinet may be, for example, that it can be fitted with lockable doors which may be used to control access for security or billing purposes.

FIG. 4 shows an example prior art RFID enabled portable cabinet 401 which is mounted on wheels 405. The portable cabinet 401 includes a number of RFID enabled shelves 403 that include RFID antennas. These are connected using RF cable 404 to a reader 402. The reader is powered and communicates with other devices through cable 406. This reader could however be powered from a local battery and/or the external communication could be by a wireless connection.

An RFID enabled cabinet would typically require a planar antenna array as described in WO2007/030861 to be incorporated into some or all of its shelves. FIG. 5 shows a section of an RFID enabled cabinet 501 with two shelves 502. Each shelf consists of an external housing 503 and an internal planar antenna array 504. The antenna array is connected to the reader (not shown) by an RF cable 505. The cost of the planar array antennas 504 is high and each cabinet may have 5 or more shelves 502 with antennas 504. The large number and high cost of these antenna arrays makes the cost of such RFID enabled cabinets high and is a serious impediment to their wide scale adoption.

One exemplary solution is to incorporate a movable antenna as described in Australian Patent Application 2013201425 into each cabinet shelf. For a typically square shelf any movable internal antenna array would need to be half the size of the shelf. The reduced cost advantage of the smaller sized internal movable array is offset somewhat by the added mechanical complexity of the translation mechanism however overall it would provide for an advantageous reduction in the cost of the RFID enabled cabinet. The cost of antennas and other mechanical mechanisms is however still a significant part of the overall cost of an RFID enabled cabinet and is a serious impediment to their wide scale adoption.

In many RFID enabled cabinet applications the identification of tagged items for stocktaking, billing or ordering purposes is not required on a real time basis and need only be done on a per use, daily or other infrequent basis. The inclusion of high cost RFID electronics into a storage cabinet where the RFID electronics is only used on an infrequent basis is thus considered expensive, inefficient and an impediment to the wide scale adoption of RFID.

There is thus a need to create an RFID enabled cabinet and/or storage system and/or method which is relatively scaleable. Such a cabinet would be considered highly advantageous and allow the wide scale adoption of RFID in applications where the high implementation cost has previously prevented the adoption of RFID.

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

SUMMARY OF INVENTION

An object of the present invention is to provide an improved interrogator.

It is another object of the embodiments described herein to overcome or alleviate at least one of the above noted drawbacks of related art systems or to at least provide a useful alternative to related art systems.

In a first aspect of embodiments described herein there is provided an RFID interrogator and/or method of interrogating comprising a first part having at least one antenna adapted to radiate an interrogation field, and at least one second part being adapted to enable tag(s) to be moved proximate the interrogation field for the purpose of interrogation, the second part being adapted to operatively associated with the first part.

Preferably, the first part is adapted for insertion into the second part.

The present invention has application to multiple and/or a wide variety of tag(s), such as, but not limited to tag(s) that operate at any one or any combination of suitable frequencies. For example, but not limited to, the recognised RFID frequency band(s), that is LF, HF, UHF or SHF, for example:
LF: 125 kHz-134.2 kHz: low frequencies,
HF: 13.56 MHz: high frequencies,
UHF: 860 MHz-960 MHz and 2.45 GHz: ultra high frequencies,
SHF: 5.8 GHz: super high frequencies In a second aspect of embodiments described herein, there is provided a method of and/or apparatus adapted to enable RFID interrogation of tag(s), comprising providing in a first part of an interrogator, at least one antenna adapted to radiate an interrogation field, and providing a second part being adapted to store or hold tag(s) and configuring the first and/or second parts to mutually and releasably couple in order to enable the tag(s) to be interrogated.

In a third aspect of embodiments described herein, there is provided a trolley comprising at least one shelf adapted to store at least one item having an associated tag, the shelf being configured to facilitate interaction with an antenna of an interrogator for the purpose of interrogating the tag, the shelf being further configured to enable an interrogating field to be received by the tag, the trolley being moveable relative to the interrogator.

In a fourth aspect of embodiments described herein, there is provided a trolley comprising at least one antenna of an interrogator for the purpose of interrogating at least one item having an associated tag stored on at least one shelf configured to facilitate interaction with an antenna of an interrogator, wherein the antenna is adapted for insertion into the shelf, the trolley being moveable relative to the shelf.

In another aspect of embodiments described herein, there is provided a method of identifying an arbitrarily large number of items having associated RFID tags.

In yet another aspect of embodiments described herein there is provided a method of identifying an arbitrarily large number of items having associated RFID tags with any of 1, 2 or full 3 dimensional reading capability.

Preferably, a method of reading and/or interrogation is substantially in accordance with the disclosure in WO2004/019055, herein incorporated by reference.

Preferably, a method of reading and/or interrogation is substantially in accordance with U.S. Pat. No. 5,302,954, herein incorporated by reference.

Preferably, a method of power, interrogating and/or communicating with an RFID device is substantially in accordance with WO1999/034526, herein incorporated by reference.

In one particular aspect, embodiments of the present invention are suitable for use in the identification of RFID transponders or other RFID devices, such as those attached to items or embedded in plastic tokens or cards that are arranged closely together and/or are stacked on each other and/or placed on shelving for logistical and storage purposes. Furthermore, the aspects of the present invention relate to an arrangement and/or layout of an interrogator including an arrangement of antenna coils.

Preferably a method of controlling magnetic fields is substantially in accordance with the teaching of WO99/49337, herein incorporated by reference.

Other aspects and preferred forms are disclosed in the specification and/or defined in the appended claims, forming a part of the description of the invention.

In essence, embodiments of the present invention stem from the realization that an RFID enabled interrogator can be advantageously divided into two parts; the RFID interrogator with its associated antennas being provided with the first part of the interrogator and the second part of the RFID interrogator being adapted to bring tag(s) in and out of range of the antennas for the purpose of reading and/or identification. For example, the interrogator may be fixed and shelving or other suitable means carrying, holding or supporting tag(s) may be moveable, or visa versa. The invention is applicable to all tag types irrespective of operating frequency. Other electronics associated with the function of identification (as would be known in the art) may be coupled with the first and/or the second part of the RFID interrogator. In one embodiment, the RFID interrogator with its associated antennas becomes a relatively fixed part, such as a docking station(s) designed to have the second part moved into or near the interrogation field provided by the antenna of the first part. The actual act of 'docking' is not necessary, as the RFID system may be contactless. Thus, the second part may be moveable shelving adapted to be received and/or nestled in the first part for interrogation of items stored in the second part. In another form, the antenna is adapted to nestle and/or integrate with the second part of the interrogator in order to facilitate interrogation of tag(s).

A plurality of second parts may be used with the same (one) first part. When the items in the second part, such as a cabinet, require identification the cabinet is moved to the first part, such as a docking station, where the cabinet is mated to the docking station which then identifies the tagged items in the cabinet. One docking station can service a large number (many tens or even hundreds) of cabinets providing an enormous cost saving.

In other words, in one aspect of invention, there is provided an RFID docking station which includes an interrogator and shelving antenna designed to be temporarily mated into the shelves of a cabinet so that the tagged items on the cabinet shelves can be identified as exemplified in various embodiments disclosed herein.

For the purposes of explaining the present invention, it is assumed that the docking station's antennas are able to identify tagged items in any of 1, 2 or 3 dimensions, preferably the antenna can identify items in 3 dimensions as described in any of WO2007/030861, WO2009/149506 and/or Australian Patent Application 2013201425.

In one example of an aspect of the present invention, a docking station consisting of an RFID interrogator, shelving antennas, mobile cabinets with shelves where the docking station antennas and the cabinet shelves interpenetrate when the mobile cabinet is offered up to the docking station such that the antennas are able to identify tagged items on the cabinet shelves. Preferentially the cabinet shelves should cover or enclose their respective docking station antennas on both their upper and lower surfaces (like a sock) so that items on the cabinet shelves are not knocked or pushed by the interrogator antennas however this is not essential.

In another example of an aspect of the present invention the docking station consisting of an RFID interrogator and shelving antennas may include an RF screening enclosure for the shelving antennas. The screening would preferentially be made of a high conductivity metal such as aluminium. The screening enclosure may also include a low reluctance magnetic material such as ferrite on some or all of the inside of the enclosure too assist or improve the coupling between the antennas and the tags on the tagged items.

In another example of an aspect of the present invention the docking station antennas may include a fixed and/or moveable support system to hold the antennas at their correct position for mating with the cabinet shelves and/or to provide protection from damage.

In another example of an aspect of the invention screening doors can be fitted to the docking station which can close around the cabinet when interrogation is occurring to improve the reliability of the RFID interrogation process.

In another example of an aspect of the invention the docking station can utilise movable antenna arrays as described in Australian Patent Application 2013201425.

The inventors have further realised that another advantage of the invention when applied to the coil array as described in WO2007/030861, WO2009/149506 and Australian Patent Application 2013201425 is that a single docking station can be used to identify tagged items on many tens or even hundreds of mobile cabinets which do not contain any or only limited electronics providing an enormous cost saving.

The present invention has many applications, including any application where antennas are used to radiate fields, especially for the purpose of interrogation of a remote device. For example, in RFID shelving applications such as general warehousing and the consignment storage of medical devices, medical instruments, medical implants and medical supplies, documents, files, books and forensic samples where cabinets are used and where fitting said cabinets require (prior art) antennas that are otherwise likewise to be expensive. In a particular application, the present invention may be used in conjunction with RFID devices, such as, by way of example only, RF transponders, tags, tokens, labels, etc. Such devices may be used in a wide variety of applications, including, without limitation, article tracking such as shelving and storage systems, medical devices and supplies, document management or article identification and/or sorting, gaming apparatus and gaming tokens, and luggage identification.

In one form, the invention relates to an identification system, and devices used in the system. Examples of the devices include transponders and/or apparatus adapted to be incorporated into items for storage on shelving and/or in storage systems which utilise cabinets. Another example of the devices includes transponders and/or apparatus adapted to be incorporated into articles in a hospital, such as medical instruments, medical devices, medical implants and medical supplies, for the purposes of stocktaking, billing and ordering. Still another example of the devices includes transponders and/or apparatus adapted to be incorporated into articles in a secure site, such as legal evidence samples which employ the use of a transponder and/or other identification device attached to the sample(s) for the purposes of monitoring and/or recording movements of the samples. Still another example of the devices includes tokens and/or apparatus adapted to be incorporated into gaming tables and/or devices for monitoring and/or recording gaming or other transactions or movements in a casino, such as gaming transactions which employ the use of a gaming token which token has a transponder and/or other identification device therein.

In another form, the invention relates to a system. Further details are disclosed herein.

Advantages provided by the present invention comprise the following:
- may be used to identify RFID tag on cabinet shelves
- may be used to identify items in an arbitrarily large number of cabinets
- may be used to create a 1, 2 or 3 dimensional reading volume above and/or below the reading area inside a cabinet
- The system cost is kept relatively low because of the small number of docking or interrogating stations relative to the large number of cabinets;
- The emissions from the interrogator's antennas can be kept relatively low because of the use of a screened enclosure at the docking station;
- may be used to identify items in an arbitrarily large number of cabinets at relatively low cost Throughout the specification, the term 'docking station' or 'docking' is not meant to convey the idea of 'contact'. The term 'docking station' and/or 'docking' is intended to convey that the two pats of the interrogator may be brought within proximity of each for the purpose of reading/interrogating tag(s). The actual act of 'docking' is not necessary, as the RFID system may be contactless.

Throughout this specification, reference to a 'tag' is intended to include, without limitation, any identification device(s) rendered in any technology which enables identification, for example an RFID device comprising a microchip placed on a powering, transmitting and/or receiving antenna carried on a substrate (inlay) and that is powered externally by an electromagnetic field, an inductive field, a magnetic field or by a battery. 'Tag' also includes reference to one or more RFID tags and/or reference to a tag(s) as disclosed in the incorporated disclosures noted above. In one specific form of the invention, a tag may be a label or adhesive note or have any other method of affixing identity to an article or thing in any form, such as a device comprising an Application Specific Integrated Circuit (ASIC) "chip" attached to an antenna or having an antenna attached to it, or where an antenna forms past of the chip assembly itself and where the chip and the antenna structure, including optionally a capacitor or capacitors and which device functions as an inductively powered passive transponder or a battery powered electronic transponder or is a transponder powered by some other means. Without limitation, a tag may be a gaming token, chip, identification device, badge, tag, ticket, playing cards, betting slip lottery ticket, a transponder, a token, insert, transponder, chip, label, identification device, badge, inlet, inlay, ticket, wireless memory or any other form of identifiable device and may be rendered in any technology which enables identification. For example, the tag may be an RFID tag. In a further example, and without limitation, the identification device may be an ASIC, other microchip, an ASIC with an associated antenna assembly, or an antenna without a chip where electronic circuitry included in the printed antenna structure, provides the intelligence of the device, logic means or is a tuned antenna. Throughout the specification, reference to an 'article' includes reference to one or more articles or items and is anything associated with a tag. Furthermore, reference to an article may include reference to one 'article' residing in or being associated with another 'article'. An 'article' may refer to any other item that can be identified, traced or tracked, such a medical devices, medical supplies or medical implants, postal or courier items, parcels, food, package, baggage, or any other product or good whatsoever.

Throughout this specification, reference to an 'interrogator' or 'interrogated' includes reference to a read only or read and write device or actuator that may power a tag, communicate with a tag, receive information from a tag, read a tag, transmit information to a tag and/or signal to and/or from a tag. This includes for example an RFID enabled regions, stores and/or containers adapted to communicate with tags stored or moved therein.

Throughout this specification, a tag may be rendered in any technology which enables identification. The tag may operate at any one or more of the recognised RFID frequency band, that is LF, HF, UHF or SHF but is in no way limited to those frequency bands.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

FIGS. 6a, 6b, 6c and 6d illustrate one embodiment of an aspect of the invention.

Figure 1:
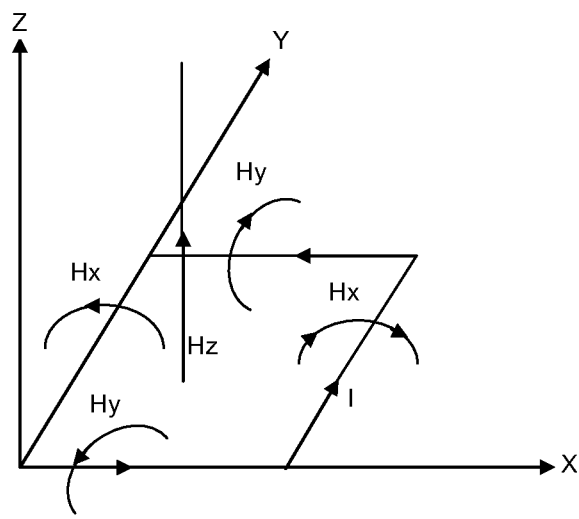
FIG. 1 illustrates, in schematic form, a prior art single coil of rectangular form and its resultant magnetic field when energised.
Figure 2:
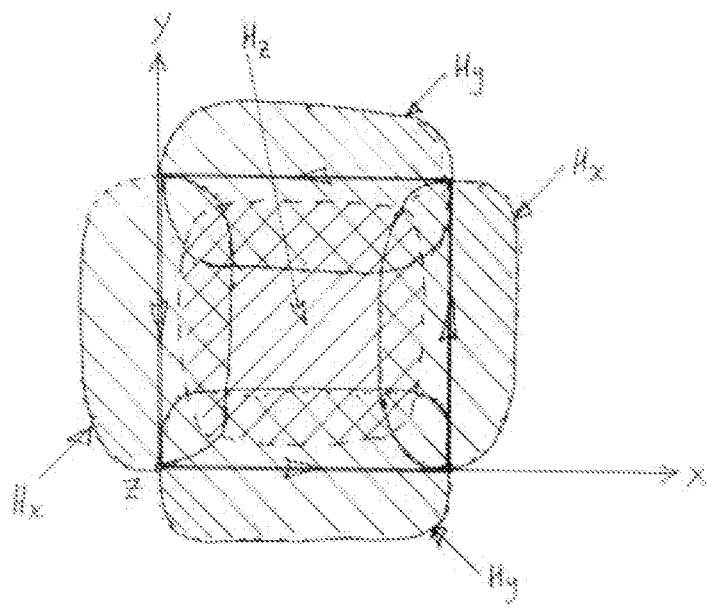
FIG. 2 illustrates regions around the coil of FIG. 1 where magnetic fields are produced.
Figure 3:
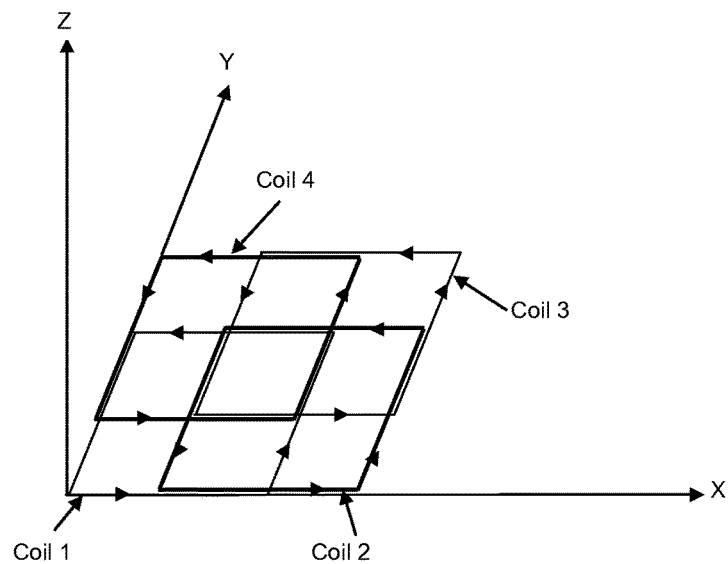
FIG. 3 illustrates an array of coils and illustrates how, when appropriately switched, a field in the X, Y and Z directions is produced as described in WO2007/030861.
Figure 4:
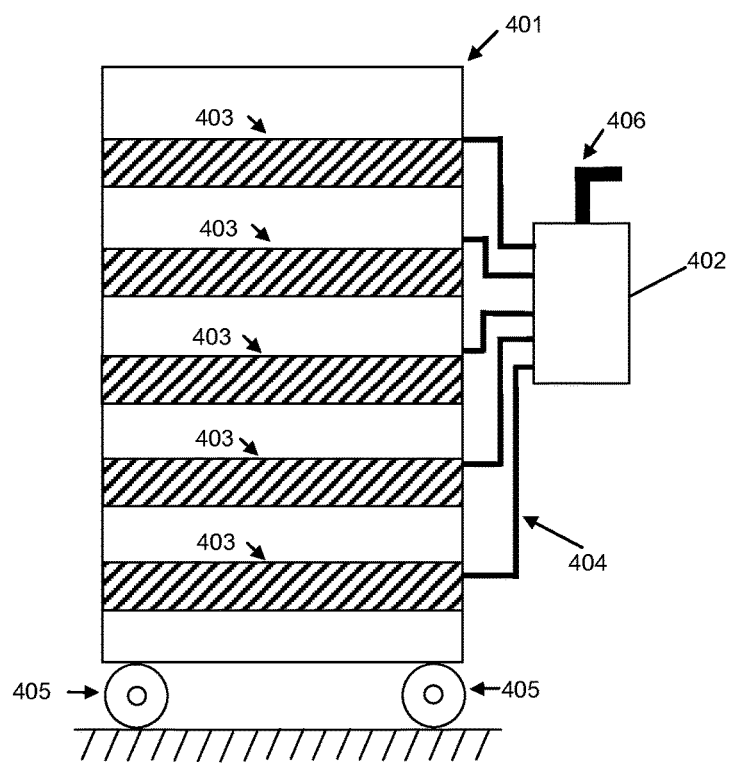
FIG. 4 illustrates a prior art RFID enabled cabinet where an array of coils as described in WO2007/030861 are incorporated into each shelf.
Figure 5:
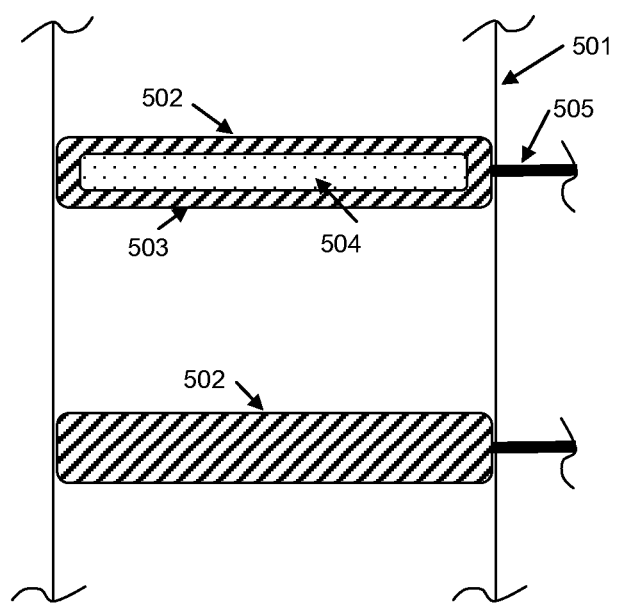
FIG. 5 illustrates a cross sectional view of the RFID cabinet of FIG. 4 showing an embedded antenna array as described in WO2007/030861.
Figure 6A:
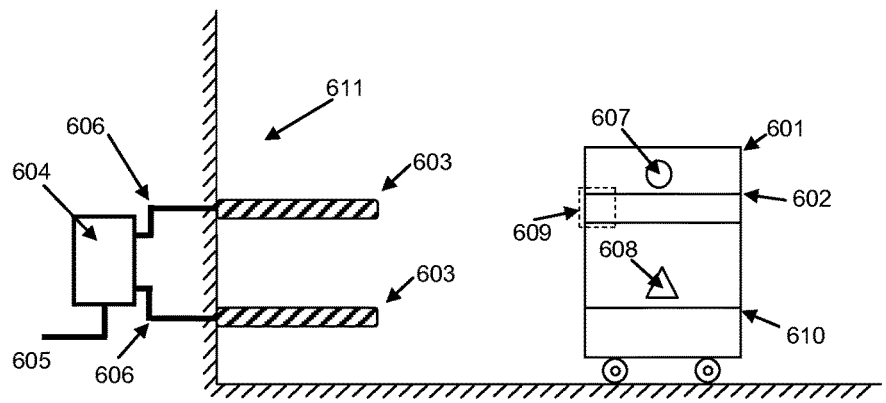
FIGS. 6a, 6b, 6c and 6d illustrate a first embodiment of the present invention.
Figure 6B:
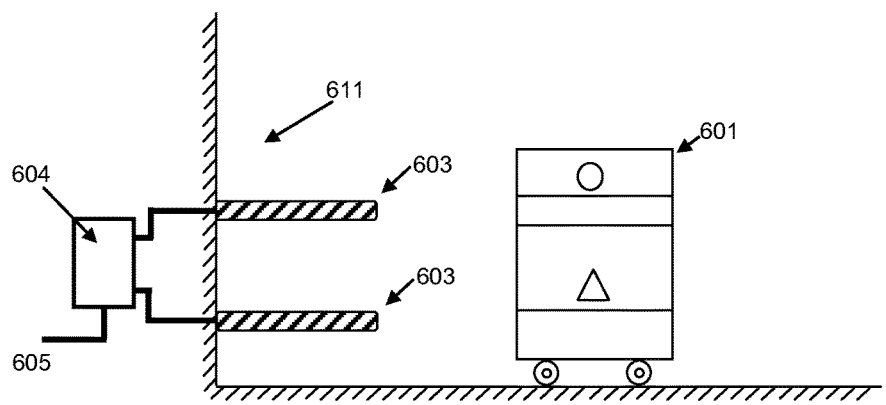
Figure 9A:
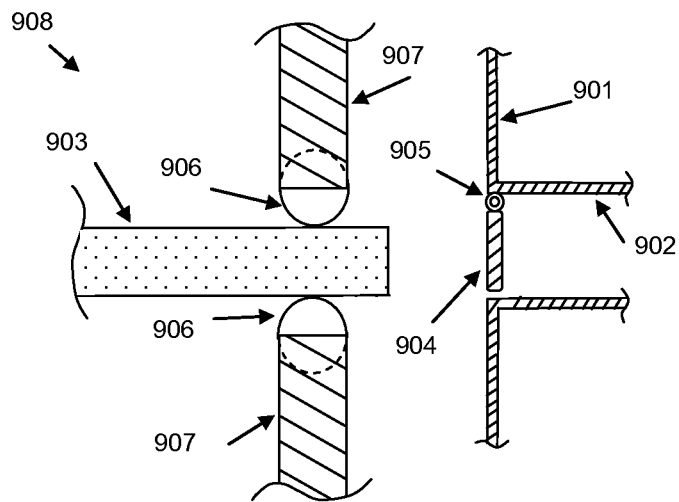
FIGS. 9a and 9b illustrate another embodiment of an aspect of the present invention.
Figure 9B:
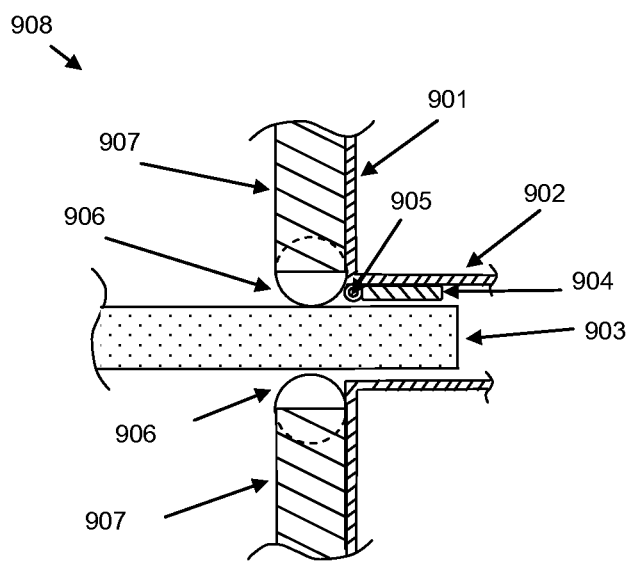

In FIG. 6a a mobile cabinet 601 with two shelves 602 and 610 is shown. Tagged items 607 and 608 are placed on the shelves. For clarity purposes only two shelves are shown however any greater or lesser number of shelves can be used. A docking station 611 is shown consisting of an RFID reader 604 connected by RF cables 606 to antenna 603. The reader is connected by cable 605 to receive power and communicate with other devices. For clarity purposes only two antennas are shown however any greater or lesser number of antennas can be used. Detail of area 609 of shelf 602 is shown in FIGS. 9a and 9b In FIG. 6b the mobile cabinet 601 is moved towards the docking station 611.

Figure 6C:
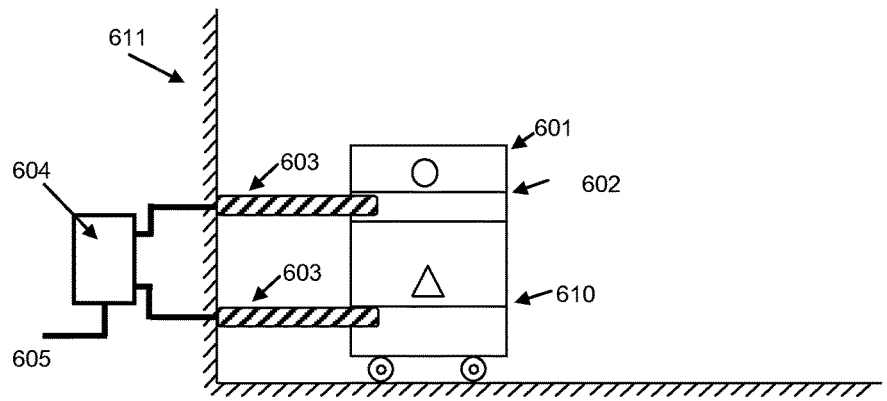

In FIG. 6c the mobile cabinet 601 has partially engaged with the antennas 603 of the docking station 611. There are two cabinet shelf types 602 and 610 shown. With shelf 602 the shelf has two layers and the antenna 603 penetrates fully into the shelf 602 and the antenna 603 is covered both above and below by the shelf 602. In this way there is no chance that items on the shelf below can be knocked or moved by the antenna 603. With shelf 610 the shelf has single layer and the antenna 603 is inserted under the shelf. The shelf construction is much simpler and for short items where there is no chance that the antenna can knock or move them a simple single layer shelf is adequate.

Figure 6D:
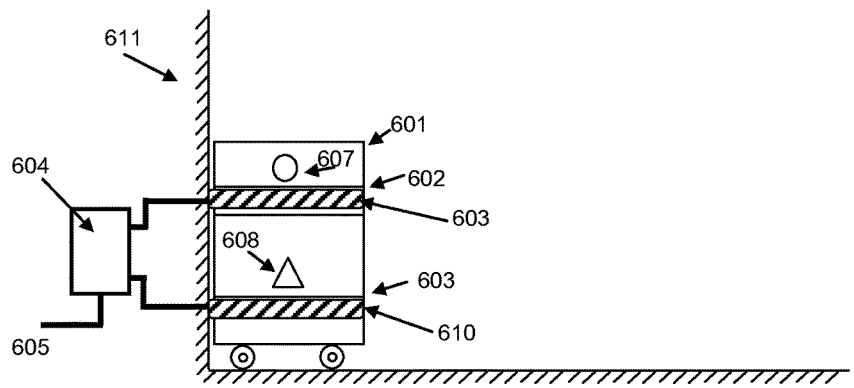

FIG. 6d shows the cabinet 601 fully engaged with the docking station 611. Antennas 603 have fully engaged with their respective shelves 602 and 610 and reader 604 is able to interrogate and identify items 607 and 608. Once interrogation is completed the cabinet 601 is removed from the docking station which is now free to interrogate another and different cabinet.

Figure 7A:
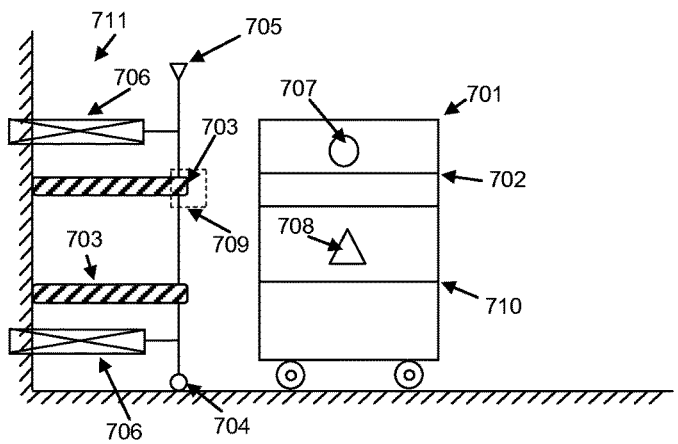
FIGS. 7a, 7b and 7c illustrate a second embodiment of the invention.
Figure 7B:
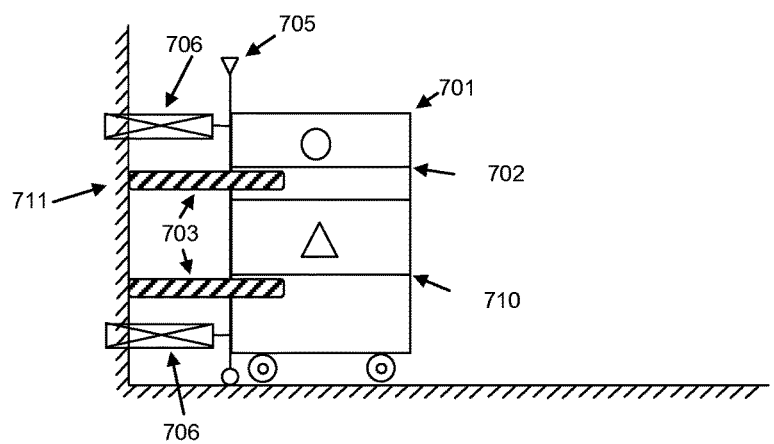
Figure 7C:
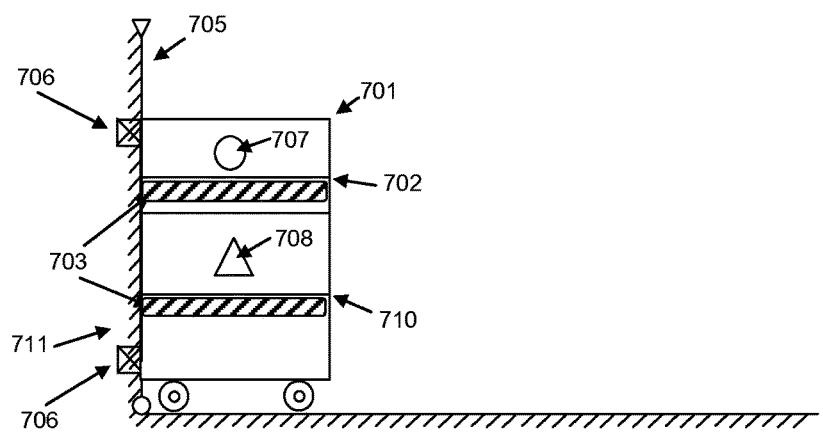

The docking station 611 antennas 603 as shown are exposed and vulnerable to physical damage and ideally a protection mechanism is required. FIGS. 7a, 7b, and 7c illustrate another embodiment of an aspect of invention which incorporates a protection mechanism for the docking station antennas.

In FIG. 7a a mobile cabinet 701 with two shelves 702 and 710 is shown. Tagged items 707 and 708 are placed on the shelves. For clarity purposes only two shelves are shown however any greater or lesser number of shelves can be used. A docking station 711 is shown consisting of two antenna 703, a movable physical barrier 705 which is supported by some means 704 that allows the barrier 705 to move, mechanical retraining devices 706 that keep the barrier 705 correctly positioned which would typically be vertically true and as far forward as possible. For clarity only two antennas are shown however any greater or lesser number of antennas can be used and the reader and RF cables connected to the antennas 703 are likewise for clarity purposes not shown. Detail of area 709, the intersection of the antenna 703 and the barrier 705, is shown in FIGS. 9a and 9b.

There are two cabinet shelf types 702 and 710 shown. With shelf 702 the shelf has two layers and the antenna 703 penetrates fully into the shelf 702 and the antenna 703 is covered both above and below by the shelf 702. In this way there is no chance that items on the shelf below can be knocked or moved by the antenna 703. With shelf 710 the shelf has single layer and the antenna 73 is inserted under the shelf. The shelf construction is much simpler and for short items where there is no chance that the antenna can knock or move them a simple single layer shelf is adequate.

In FIG. 7b the mobile cabinet 701 has moved towards the docking station 711 and is partially engaged with the antennas 703 of the docking station 711. The barrier 705 has engaged with the cabinet 701 and is being pushed back by the advancing cabinet. The mechanical retaining devices 706 retract keeping the barrier 705 engaged with the cabinet 701. As the barrier retracts the antennas 703 project further from the barrier 705 and penetrate into or under the cabinet shelves 702 and 710.

FIG. 7c shows the cabinet 701 fully engaged with the docking station 711. Antennas 703 have fully engaged with their respective shelves 702 and 710 and are able to interrogate and identify items 707 and 708. The barrier 705 is fully retracted and the mechanical retraining devices 706 are likewise fully contracted. Once interrogation is completed the cabinet 701 is removed from the docking station which is now free to interrogate another and different cabinet. At all times the antennas 703 are not vulnerable to damage as they are not exposed being behind the barrier 705.

The restraining mechanism 706 may be a mechanical system of wire pulleys or mechanical geared ratchets or pneumatic pistons or any other suitable method of restraining and moving the barrier 705. The actual method used for moving the barrier 705 may be accomplished by various means, as would be known by the skilled person.

Figure 8:
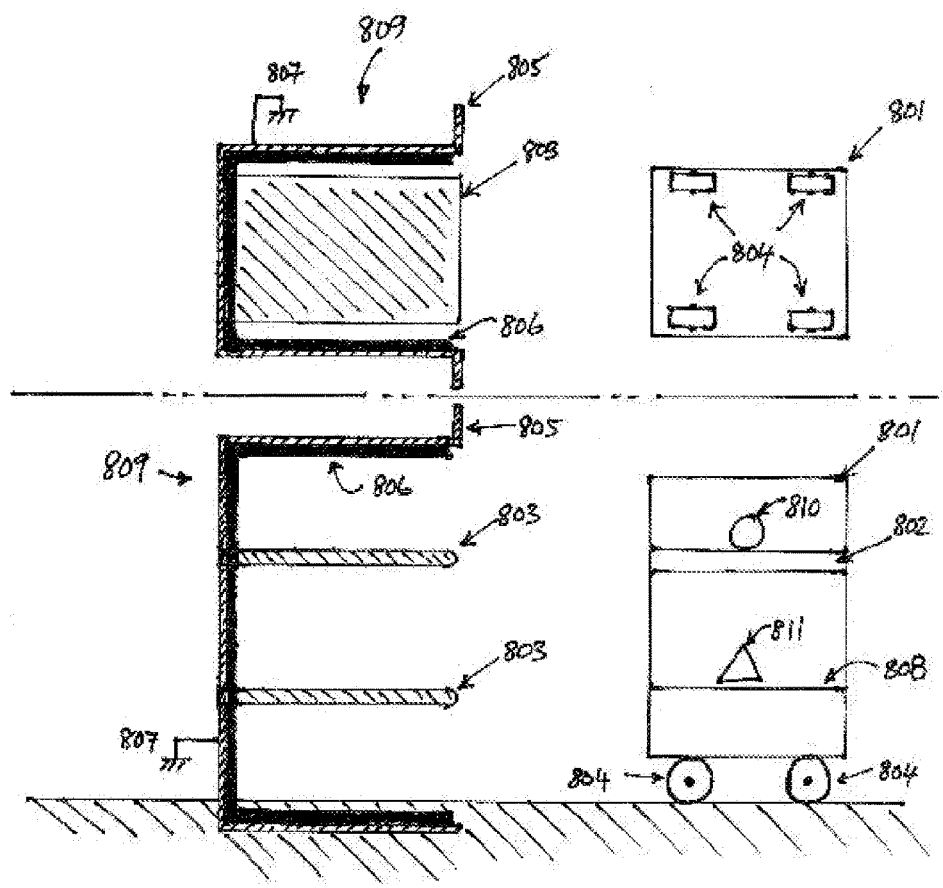
FIG. 8 illustrates another embodiment of an aspect of the present invention.

FIG. 8 illustrates another embodiment of an aspect of invention. Two views of mobile cabinet 801 and docking station 809 are shown. One view is from the side and the other view is from below. FIG. 8 shows mobile cabinet 801 mounted on wheels 804 with two shelves 802 (double layer shelf) and 808 (single layer shelf). For clarity purposes only two shelves are shown however any greater or lesser number of shelves can be used. Tagged items 810 and 811 are shown on the respective shelves. Docking station 809 shows two antennas 803. For clarity only two antennas are shown however any greater or lesser number of antennas can be used and the reader and RF cables connected to the antennas 803 are likewise for clarity purposes not shown. A conductive RF screen 805 consisting of a high conductivity metal layer such as aluminium is fitted around the docking station to provided RF screening for the antennas 803 from external interference. The RF screen 805 may be connected to a ground potential 807 to assist with the screening function. The docking station may also be fitted with a ferrite layer 806 on the inside surface of the screen to assist with the magnetic coupling between the antennas 803 and the tagged items 810 and 811.

A screening layer 805 and/or a ferrite layer 806 are highly beneficial to the performance and reliability of an RFID enabled cabinet reader however their high relative cost precludes their use in a conventional RFID cabinet. This cost problem is obviated by the invention as screening and ferrite is only required for the docking station and does not add to the cost of the cabinets. This provides a substantial cost advantage.

FIGS. 9*a* and 9*b* show the area detail of area 609 of cabinet 601 and area 709 of docking station 711.

FIG. 9*a* shows a section of the cabinet 901 with a two layer shelf 902 and a docking station 908. A cover 904 closes off the cavity inside the shelf 902 to prevent debris from entering the cavity. The mechanical retraining device 905 holds the cover 904 in the correct position. The docking station's 908 antenna 903 and mechanical barrier 907 are shown with restraining devices 906 holding the antenna 903 in the correct position with respect to the shelf 902 and allowing the barrier 907 to retract as required when the cabinet 901 is offered up to, and engages with, the docking station 908.

FIG. 9*b* shows the arrangement of the parts shown in FIG. 9*a* when the cabinet 901 has engaged with the docking station 908. The antenna 903 has penetrated into the shelf 902. Cover 904 has been retracted and the antenna 903 can slide unimpeded into the shelf.

Figure 10A:
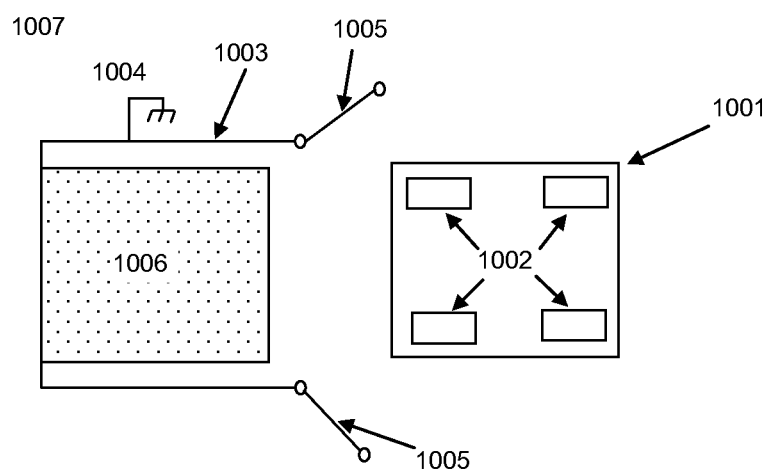
FIGS. 10a and 10b illustrate a third embodiment of an aspect of the present invention.
Figure 10B:
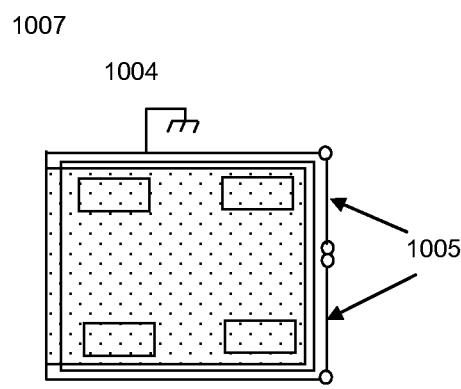

FIGS. 10*a* and 10*b* illustrate a third embodiment of an aspect of the present invention. FIGS. 10*a* and 10*b* show a cabinet 1001 and a docking station 1007 from below.

FIG. 10*a* shows a cabinet 1001 fitted with wheels 1002 and a docking station 1007 with antennas 1006, in a screened enclosure 1003 connected to ground 1004 if required and fitted with screened doors 1005. For clarity purposes the docking station's reader and antenna cables are not shown.

FIG. 10*b* shows the cabinet fully engaged with the docking station where the screened doors 1005 have been closed in order to provide a complete screening of the cabinet. Screening serves to prevent external interference affecting the reader reliability and minimises leakage of the RFID signal from the docking station which might affect adjacent equipment. The door would include a high conductively material such as aluminium that is electrically connected to the screened enclosure 1003. Both the screened enclosure and the screening doors can be fitted with a ferrite layer on inside surface of the screening layer as shown in FIG. 8 to improve coupling between the antenna 1006 and tags in the cabinet 1001.

Figure 11A:
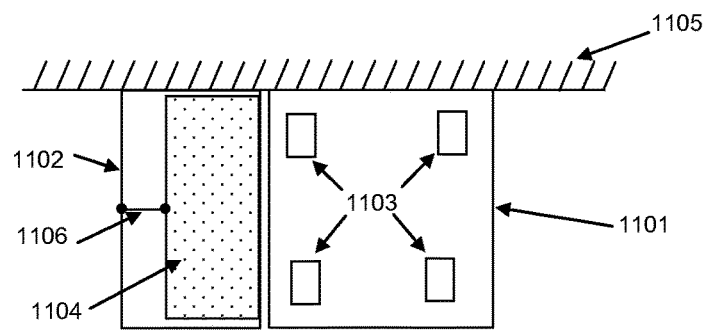
FIGS. 11a, 11b, 11c and 11d illustrate a fourth embodiment of an aspect of the present invention.
Figure 11B:
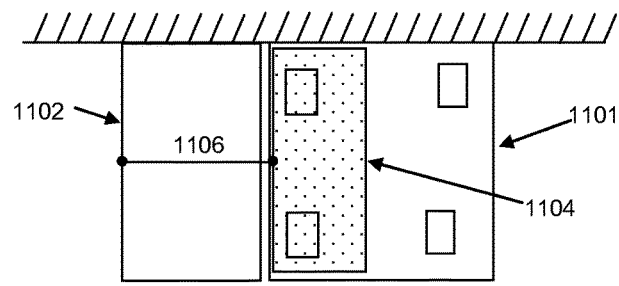
Figure 11C:
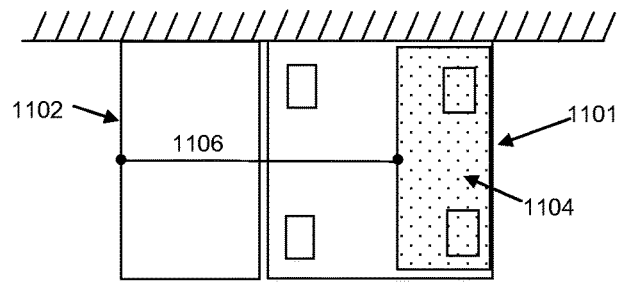
Figure 11D:
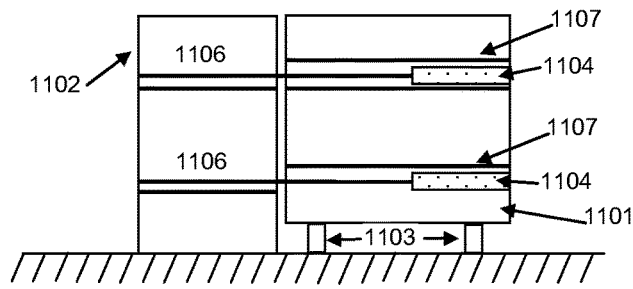

FIGS. 11*a*, 11*b*, 11*c* and 11*d* illustrate a fourth embodiment of an aspect of the present invention. FIGS. 11*a*, 11*b* and 11*c* show a cabinet 1101 and a docking station 1102 from below. FIG. 11*d* shows the same cabinet 1101 and docking station 1102 from the side.

FIG. 11*a* shows a cabinet 1101 fitted with wheels 1103 and a docking station 1102 with movable array antennas 1104, each fitted with a mechanical shifting mechanism 1106. The cabinet 1101 and the docking station 1102 are shown against a wall 1105. For clarity purposes the docking station's reader and antenna cables are not shown.

The movable array antennas 1104 are adapted to be shifted and/or moved by shifting mechanism 1106 in order to to create a larger virtual antenna array as described in Australian Patent Application 2013201425. The shifting mechanism 1106 may be a mechanical system of wire pulleys or mechanical geared ratchets or pneumatic pistons or any other suitable method of shifting the movable antenna array 1104. The actual method used for moving the movable antenna array 1104 may be accomplished by various means, as would be known by the skilled person.

FIG. 11*b* shows the docking station 1102 movable antenna arrays 1104 being shifted inside the cabinet 1101.

FIG. 11*c* shows the docking station 1102 movable antenna arrays 1104 being shifted across the full length of the cabinet 1101.

FIG. 11*d* shows a side view of the mobile cabinet 1101 mounted on wheels 1103 with two shelves 1107 (double layer shelf) and 1108 (single layer shelf). For clarity purposes only two shelves are shown however any greater or lesser number of shelves can be used. The cabinet 1101 is beside the docking station 1102 with the movable antenna arrays 1104 fully shifted across the cabinet 1101 by the shifting mechanisms 1106.

The docking station 1102 is shown beside the cabinet 1101. This arrangement has the advantage that the depth off the wall of the docking station is no greater than the cabinet. Alternatively the docking station could be located between the wall and the cabinet. An RF screen with or without ferrite as shown in FIG. 8 and screening doors as shown in FIGS. 10*a* and 10*b* can be fitted to the docking station 1102.

The RF screen with or without ferrite as shown in FIG. 8 and screening doors as shown in FIGS. 10*a* and 10*b* may alternatively be fitted to the cabinet 701, 801, 1001 or 1101. When docked with the antennas as disclosed above, the antennas would be screened from interference and the screen may also serve as a mechanical barrier to prevent items/tag(s) on the shelf from either falling off the shelf or being inadvertently moved.

Whilst the above description has been directed to an embodiment of the invention where the docking station (consisting of the RFID interrogator with RFID shelving antennas) is static or stationary and the cabinets (with shelves where the docking station antennas and the cabinet shelves interpenetrate) are mobile the roles of being stationary and mobile can be reversed whilst still following the overall inventive concept as herein disclosed. There may be cases where it is more convenient to move the docking station to the cabinets. For example where many cabinets are lined up against a wall at a great distance from the docking station. Moving the docking station to each cabinet may be considered much more efficient, using much less travel time and distance, than moving each the cabinet to the docking station.

Figure 12A:
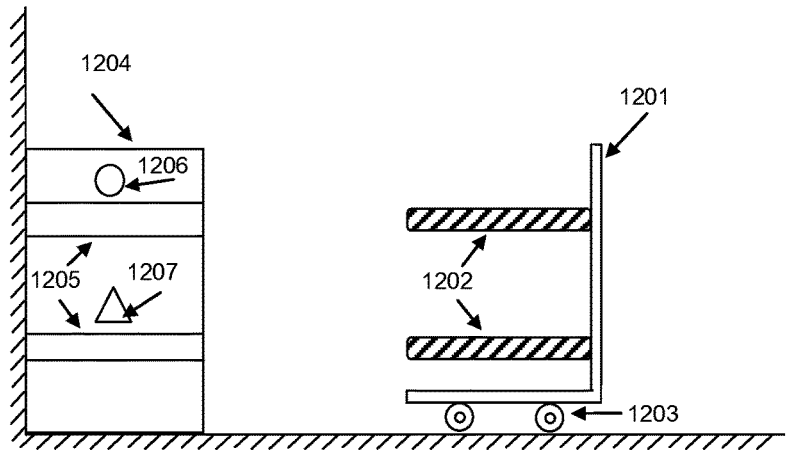
FIGS. 12a, 12b and 12c illustrate a fifth embodiment of an aspect of the present invention.
Figure 12B:
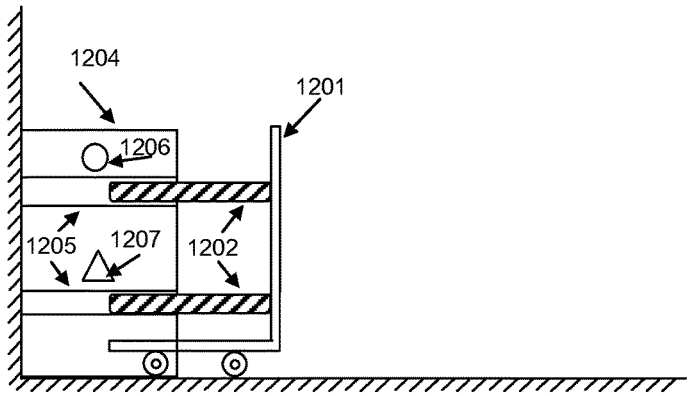
Figure 12C:
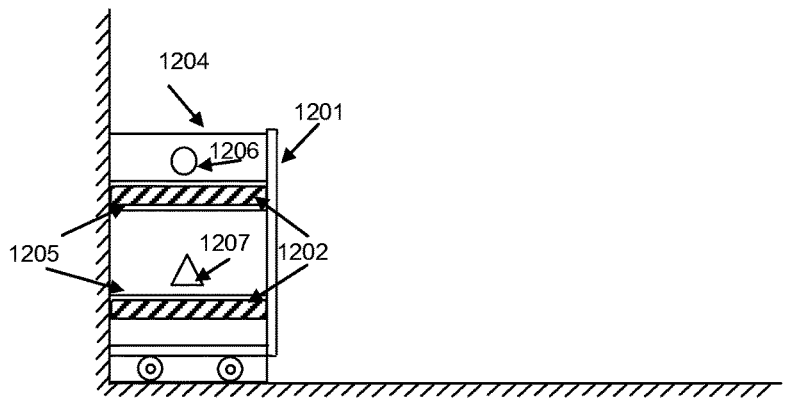

The principle of the invention remains unchanged, the RFID enabled interrogator can be advantageously divided into two parts; the RFID interrogator with its associated antennas being provided with the first part of the interrogator and the second part of the RFID interrogator being adapted to hold the tag(s) whilst they are brought in and out of range of the antennas for the purpose of reading, powering and/or identification. For example, the shelving or other suitable means carrying, holding or supporting tag(s) may be fixed and RFID interrogator and antennas may be moveable. As disclosed, the invention is applicable to all tag types irrespective of operating frequency. Other electronics associated with the function of identification (as would be known in the art) may be coupled with the first and/or the second part of the RFID enabled interrogator. In the further embodiment as illustrated in FIGS. 12a, 12b and 12c, the RFID interrogator with its associated antennas becomes a relatively mobile part, such as a mobile docking station(s) designed to have the interrogation field provided by the antenna of the first part moved into or near the second part. The actual act of 'docking' is not necessary, as the RFID system may be contactless. Thus, the first part may be a moveable docking station adapted to be inserted and/or nestled into the second part for interrogation of items stored in the second part. In another form, the antenna is adapted to nestle and/or integrate with the second part of the interrogator in order to facilitate interrogation of tag(s).

FIGS. 12a, 12b and 12c illustrate a fifth embodiment of an aspect of the invention.

In FIG. 12a a fixed cabinet 1204 with two shelves 1205 is shown. Tagged items 1206 and 1207 are placed on the shelves. For clarity purposes only two shelves are shown however any greater or lesser number of shelves can be used. A mobile docking station 1201 is shown fitted with wheels 1203 for mobility and with two array antennas 1202. For clarity purposes only two antennas are shown however any greater or lesser number of antennas can be used. Also not shown for clarity purposes are the 1201 docking station's RFID reader connected by RF cables to the array antennas 1202, the source of electrical power (such as a battery) and the communication method (such as WiFi or any other suitable method of communication) required for the mobile docking station 1201. It will be understood by those skilled in the art that these, and other electrical or mechanical devices, are required for operation but are not shown as they are not essential to the understanding of the invention.

In FIG. 12b the mobile docking station 1201 is moved towards the fixed cabinet 1204 and the array antennas 1202 have been moved proximate the shelving 1205 bringing the tagged items 1206 and 1207 closer to the interrogation field produced by the array antennas 1202 when operative.

FIG. 12c shows the mobile docking station 1201 fully 'docked' with the fixed cabinet 1204. Array antennas 1202 are docked or nestled with their respective shelves 1205 and, when operative, are able to interrogate and identify items 1206 and 1207. Once interrogation is completed the mobile docking station 1201 may be removed from the fixed cabinet 1204 and the mobile docking station 1201 then being free to be moved to interrogate another and different cabinet.

Figure 13A:
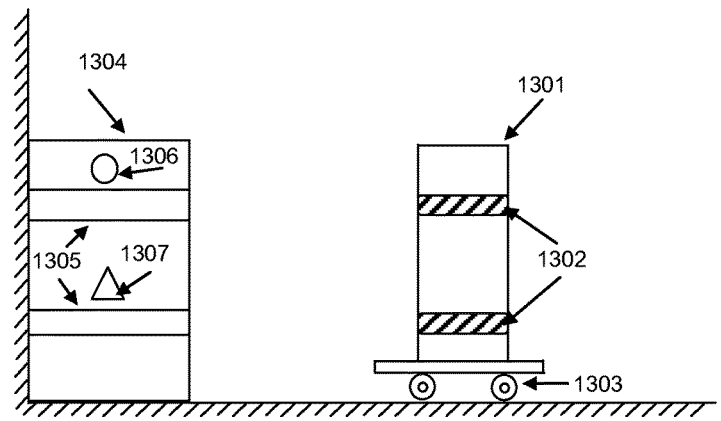
FIGS. 13a, 13b and 13c illustrate a sixth embodiment of an aspect of the present invention
Figure 13B:
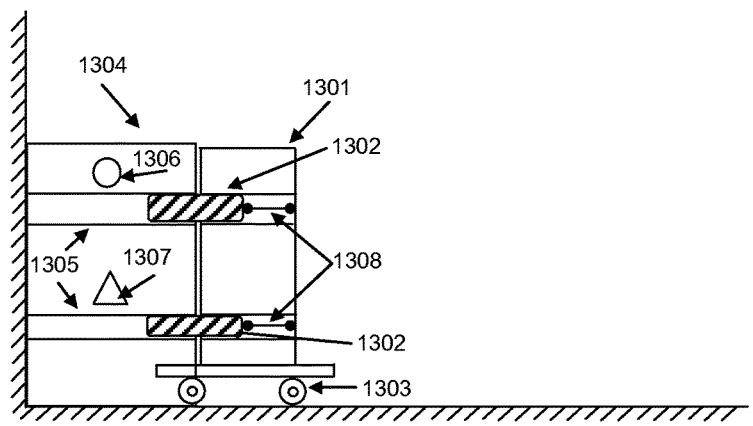
Figure 13C:
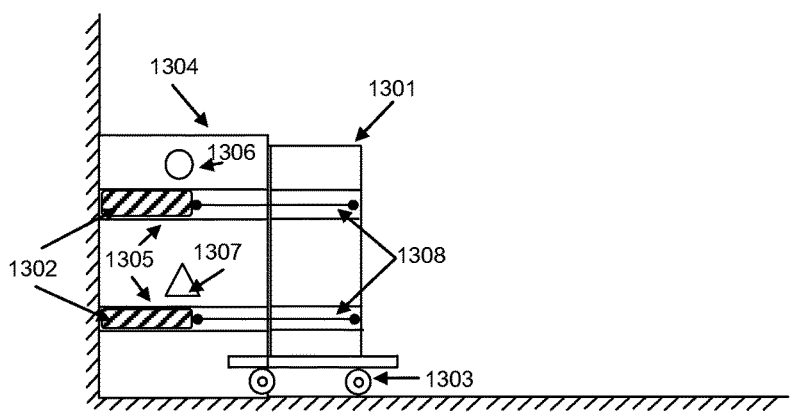

The docking station 1201 array antennas 1202 as shown may be exposed and vulnerable to physical damage and ideally a protection mechanism is required. FIGS. 13a, 13b, and 13c illustrate a sixth embodiment of an aspect of invention which incorporates one possible protection mechanism for the docking station antennas.

FIGS. 13a, 13b, and 13c show a fixed cabinet 1304 and a mobile docking station 1301. The mobile docking station 1301 is shown fitted with wheels 1303 and with movable antenna arrays 1302, each fitted with a mechanical shifting mechanism 1308. For clarity purposes only two movable antenna arrays 1302 are shown however any greater or lesser number of antennas can be used. For clarity purposes only two shelves 1305 are shown however any greater or lesser number of shelves can be used. Also not shown for clarity purposes are the 1301 mobile docking station's RFID reader connected by RF cables to the movable antenna arrays 1302, the source of electrical power (such as a battery) and the communication method (such as WiFi or any other suitable method of communication) required for the mobile docking station 1301. It will be understood by those skilled in the art that these, and other electrical or mechanical devices, are required for operation but are not shown as they are not essential to the understanding of the invention.

The movable antenna arrays 1302 are adapted to be inserted, shifted and/or moved by shifting mechanism 1308 in order to create a larger virtual antenna array as described in Australian Patent Application 2013201425, herein incorporated by reference. The shifting mechanism 1308 may be a mechanical system of wire pulleys or mechanical geared ratchets or pneumatic pistons or an insertion mechanism, or any other suitable method of shifting the movable antenna arrays 1302. The actual method used for moving the movable antenna arrays 1302 may be accomplished by various means, as would be known by the skilled person.

FIG. 13b shows the mobile docking station 1301 moved towards and fully engaged with the fixed cabinet 1304. The movable antenna arrays 1302 are shown being shifted inside and partially engaged with the shelving 1305 bringing the tagged items 1306 and 1307 close to the interrogation field produced by the movable antenna arrays 1302.

FIG. 13c shows the docking station 1301 movable antenna arrays 1302 being shifted across the full length of the cabinet's shelving 1305 and being able to interrogate and identify items 1306 and 1307. Once interrogation is completed the antenna arrays 1302 may be retracted and the mobile docking station 1301 may be removed from the fixed cabinet 1304 and the mobile docking station 1301 then being free to interrogate another and different cabinet.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. An RFID interrogator system comprising:
   a stationary interrogator having at least one antenna operative to radiate an interrogation field;
   an RFID tag reader coupled to the at least one antenna and operative to read an RFID tag when said RFID tag is proximate the interrogation field, and
   at least one mobile carrier, said at least one mobile carrier comprising a body with a plurality of shelves, each shelf for holding objects comprising RFID tags, each said at least one mobile carrier being moveable to enable its respective plurality of shelves holding objects comprising RFID tag(s) to be moved as a unit to a location proximate the interrogation field for the purpose of interrogation of the RFID tags,
   wherein each said mobile carriers, including said respective plurality of shelves, is movable for docking with the stationary interrogator;
   wherein the RFID tags on said plurality of shelves, when proximate the interrogation field, are read by the RFID tag reader,
   wherein the at least one mobile carrier is docked with the stationary interrogator for interrogation such that the at least one antenna is at least partially inside the at least one mobile carrier.

2. The interrogator system as claimed in claim 1, wherein the stationary interrogator further comprises a moveable antenna support system, said support system being coupled to the at least one antenna and operative to shift and/or move the at least one antenna within an interrogation area.

3. The interrogator system as claimed in claim 2, wherein a movement of the antenna is at least one of continuous, in discrete steps, and any combination thereof.

4. The interrogator system as claimed claim 1, wherein multiple mobile carriers are associated with the stationary interrogator.

5. The interrogator system as claimed in claim 1, wherein the at least one antenna is movable in at least one, or in any combination of the x, y and/or z directions.

6. The interrogator system as claimed in claim 1, wherein the at least one antenna is movable to a series of positions within an interrogation area, and where at each position, interrogation of RFID tags proximate the antenna's interrogation field is undertaken or activated.

7. The interrogator system as claimed in claim 1, and being operatable to interrogate tag(s) at any one or any combination of frequencies, namely:
   LF: 125 kHz-134.2 kHz: low frequencies,
   HF: 13.56 MHz: high frequencies,
   UHF: 860 MHz-960 MHz and 2.45 GHz: ultra high frequencies,
   SHF: 5.8 GHz: super high frequencies.

8. A logistics system adapted to identify an object having an associated RFID tag, the system comprising:
   storage for storing information about the object, and
   an interrogator system as claimed in claim 1 for interrogating the RFID tags in order to identify the objects and record said information in memory.

9. The system as claimed in claim 8, further comprising memory operative to store information derived from the interrogation.

10. A method of enabling RFID interrogation of tag(s), the method comprising the steps of:
    providing in an interrogator of an interrogator system, a plurality of antennas, each antenna being operative to radiate an interrogation field,
    providing an RFID tag reader operative to read an RFID tag when said RFID tag is proximate the interrogation field;
    providing at least one carrier, said at least one carrier comprising a body with a plurality of shelves, each shelf for holding objects moveable from the shelf and associated with RFID tags,
    moving said carrier to enable the plurality of shelves for holding objects associated with RFID tag(s) to be proximate the interrogation field for the purpose of interrogation of the RFID tags, such that the plurality of antennas at least partially inside said carrier; and
    reading the RFID tags proximate to the interrogation field by the RFID tag reader.

11. The method as claimed in claim 10, wherein a part of the interrogator with at least one antenna is insertable into a part of the carrier adjacent to or within a corresponding shelf for holding objects associated with RFID tag(s).

12. The method as claimed in claim 10, wherein at least one of said carriers functions as a docking station for said at least one interrogator whereby said plurality of shelves are matched to said plurality of antennas so that the interrogation field interrogates the RFID tags.

13. The method as claimed in claim 10, wherein the antenna is shifted in at least one, or in any combination of the x, y and/or z directions.

14. The method as claimed in claim 10, wherein said interrogator functions as a docking station for said at least one carrier whereby said plurality of shelves are matched to said plurality of antennas so that the interrogation field interrogates the RFID tags.

15. The method as claimed in claim 10 comprising interrogating tag(s) at any one or any combination of frequencies selected from the group consisting of:
    LF: 125 kHz-134.2 kHz: low frequencies,
    HF: 13.56 MHz: high frequencies,
    UHF: 860 MHz-960 MHz and 2.45 GHz: ultra high frequencies,
    SHF: 5.8 GHz: super high frequencies.

16. The method as claimed in claim 10, wherein
    the plurality of antennas comprises a first antenna and a second antenna, and the first antenna is provided in the interrogator such that the first antenna is configured to enter the at least one carrier at a vertical depth of the at least one carrier different from the second antenna.

* * * * *